United States Patent
Kim

(10) Patent No.: US 12,176,585 B2
(45) Date of Patent: Dec. 24, 2024

(54) INTEGRATED THERMAL MANAGEMENT SYSTEM FOR FUEL CELL MOBILITY VEHICLES

(71) Applicants: Hyundai Motor Company, Seoul (KR); Kia Corporation, Seoul (KR)

(72) Inventor: Gwi Taek Kim, Whasung-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 768 days.

(21) Appl. No.: 17/378,153

(22) Filed: Jul. 16, 2021

(65) Prior Publication Data
US 2022/0200024 A1   Jun. 23, 2022

(30) Foreign Application Priority Data
Dec. 21, 2020   (KR) .................. 10-2020-0179539

(51) Int. Cl.
| | |
|---|---|
| *H01M 8/04111* | (2016.01) |
| *B60H 1/00* | (2006.01) |
| *B60L 58/33* | (2019.01) |
| *H01M 8/04007* | (2016.01) |
| *H01M 8/04029* | (2016.01) |
| *H01M 8/04082* | (2016.01) |

(Continued)

(52) U.S. Cl.
CPC ..... *H01M 8/04111* (2013.01); *B60H 1/00392* (2013.01); *B60H 1/00428* (2013.01); *B60H 1/00435* (2013.01); *B60H 1/00457* (2013.01); *B60L 58/33* (2019.02); *H01M 8/04029* (2013.01); *H01M 8/04074* (2013.01); *H01M 8/04119* (2013.01); *H01M 8/04201* (2013.01); *H01M 8/04753* (2013.01); *H01M 2250/20* (2013.01)

(58) Field of Classification Search
CPC ......... H01M 8/04111; H01M 8/04029; H01M 8/04201; H01M 8/04753; B60H 1/00392; B60H 1/00428; B60H 1/00435; B60L 58/33
USPC ......................................................... 165/279
See application file for complete search history.

(56) References Cited

U.S. PATENT DOCUMENTS

| | | | |
|---|---|---|---|
| 6,607,854 B1 * | 8/2003 | Rehg ............... | H01M 8/04089 429/416 |
| 6,629,428 B1 | 10/2003 | Murry | |

(Continued)

FOREIGN PATENT DOCUMENTS

KR   10-2019-0064739 A   6/2019

*Primary Examiner* — Steve S Tanenbaum
(74) *Attorney, Agent, or Firm* — Morgan, Lewis & Bockius LLP

(57) ABSTRACT

An integrated thermal management system for fuel cell mobility vehicles, may include a hydrogen tank configured to store hydrogen supplied to a fuel cell stack, a first turbine rotated by the pressure of the hydrogen discharged from the hydrogen tank, a refrigerant circulation line configured such that a refrigerant circulates therealong and a compressor, a condenser, an expansion valve and an evaporator are provided thereon, a second turbine mounted in the refrigerant circulation line and rotated by the high-pressure refrigerant discharged by the compressor, and a blower configured to pressurize ambient air using the rotation force of the first turbine, the second turbine or an electric motor and to supply the pressurized ambient air to an indoor air conditioning unit or the fuel cell stack.

15 Claims, 2 Drawing Sheets

(51) Int. Cl.
*H01M 8/04119* (2016.01)
*H01M 8/04746* (2016.01)

(56) References Cited

U.S. PATENT DOCUMENTS

| | | | |
|---|---|---|---|
| 7,118,818 B2* | 10/2006 | Agnew | H01M 8/04022 |
| | | | 429/441 |
| 9,623,974 B2 | 4/2017 | Johnson | |
| 2018/0277869 A1* | 9/2018 | Kusano | H01M 8/04291 |
| 2019/0363381 A1* | 11/2019 | Haag | H01M 8/04753 |

* cited by examiner

INTEGRATED THERMAL MANAGEMENT SYSTEM FOR FUEL CELL MOBILITY VEHICLES

CROSS-REFERENCE TO RELATED APPLICATION

The present application claims priority to Korean Patent Application No. 10-2020-0179539, filed on Dec. 21, 2020, in the Korean Intellectual Property Office, the entire contents of which is incorporated herein for all purposes by this reference.

BACKGROUND OF THE INVENTION

Field of the Invention

The present invention relates to an integrated thermal management system which controls of the internal environment of a mobility vehicle driven by a fuel cell, such as cooling of the fuel cell, cooling/heating of a passenger compartment, etc.

Description of Related Art

Mobility apparatuses or vehicles refer to all transportation means which carry people or cargo, and conventional mobility apparatuses or vehicles are driven using internal combustion engines and fossil fuel. When a mobility vehicle is driven, it is necessary to control the internal environment of the mobility vehicle for a mobility vehicle driver or mobility vehicle passengers, and when an internal combustion engine is used, the temperature of exhaust gas is high and thus the temperature of the interior of the mobility vehicle may be adjusted using waste heat of the exhaust gas.

Greenhouse gases generated by the use of internal combustion engines and fossil fuels are increasing the earth's temperature and causing environmental destruction, and therefore interest in mobility vehicles capable of being driven using fuel cells and hydrogen is on the rise.

However, a mobility vehicle using a fuel cell is different from a mobility vehicle using an internal combustion engine in terms of the driving methods thereof, the quantities of waste heat emitted therefrom, and systems necessary therefor, and thus requires many modifications to be capable of performing environmental control.

The fuel cell humidifies air drawn from the outside thereof and produces electricity through a reaction between hydrogen and oxygen, and thus it is necessary to pressurize air flowing into the fuel cell.

Here, when a separate blower configured to pressurize air is independently applied, the weight and the volume of the mobility vehicle and the amount of power consumed thereby are increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an integrated thermal management system which may effectively control the internal environment of a mobility vehicle employing a fuel cell system by combining the characteristics of the mobility vehicle and the characteristics of a refrigerant compression system provided inside the mobility vehicle.

In accordance with various aspects of the present invention, the above and other objects may be accomplished by the provision of an integrated thermal management system for fuel cell mobility vehicles, including a hydrogen tank configured to store hydrogen supplied to a fuel cell stack, a first turbine fluidically connected to the hydrogen tank and rotated by a pressure of the hydrogen discharged from the hydrogen tank, a refrigerant circulation line configured such that a refrigerant circulates therealong and a compressor, a condenser, an expansion valve and an evaporator are provided thereon, a second turbine mounted in the refrigerant circulation line and rotated by the high-pressure refrigerant discharged by the compressor, and a blower engaged to the first turbine, the second turbine or an electric motor and configured to pressurize ambient air using rotation force of the first turbine, the second turbine or the electric motor and to supply the pressurized ambient air to an indoor air conditioning unit or the fuel cell stack.

The pressurized ambient air may flow through an ambient air supply line, the ambient air supply line may branch off into a fuel cell line and an air-conditioning line, and the pressurized ambient air may be supplied to the fuel cell stack through the fuel cell line and supplied to the indoor air conditioning unit through the air-conditioning line.

Respective flow rates of the pressurized ambient air discharged from the blower and supplied to the indoor air conditioning unit and the fuel cell stack may be controlled by a regulator.

When the fuel cell stack generates power, the blower may be rotated by the first turbine to pressurize the ambient air and to supply the pressurized ambient air to the indoor air conditioning unit and the fuel cell stack, and when a pressure applied to the ambient air is lower than a predetermined amount of pressure, the electric motor may be additionally operated to increase the pressure applied to the ambient air.

When an interior of a fuel cell mobility vehicle is cooled, the blower may be rotated by the second turbine to pressurize the ambient air and to discharge the pressurized ambient air to the interior of the fuel cell mobility vehicle.

The evaporator may be provided inside the indoor air conditioning unit, and the blower may supply the pressurized ambient air to the indoor air conditioning unit.

A heater core may be provided inside the indoor air conditioning unit, and the heater core may be connected to a cooling fluid outlet of the fuel cell stack.

The integrated thermal management system may further include a cooling fluid circulation line configured such that a cooling fluid circulates to the fuel cell stack through a water pump, the cooling fluid of the cooling fluid circulation line may pass through the heater core and a radiator via a control valve after passing through the fuel cell stack, a stream of the cooling fluid having passed through the heater core may join with a stream of the cooling fluid having passed through the radiator, and opening of the control valve may be controlled depending on an operating state of the fuel cell stack and on whether heating of the interior of the fuel cell mobility vehicle is required.

An electric heater may be provided inside the indoor air conditioning unit, and the electric heater may be operated when a temperature of the heater core is lower than a predetermined temperature.

The methods and apparatuses of the present invention have other features and advantages which will be apparent from or are set forth in more detail in the accompanying

Figure 1:
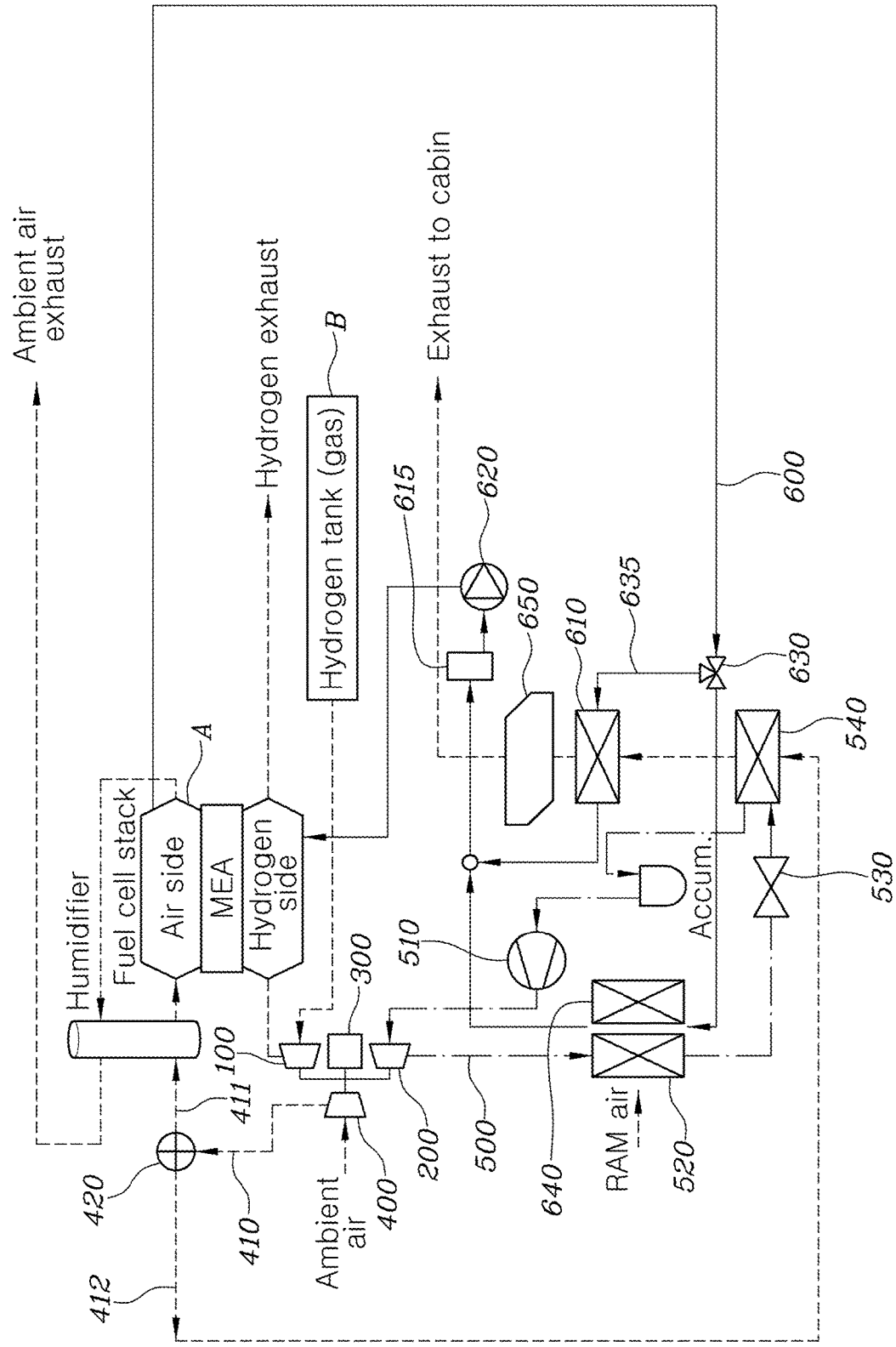
FIG. 1 is a circuit diagram of an integrated thermal management system for fuel cell mobility vehicles according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention rather unclear.

Figure 2:
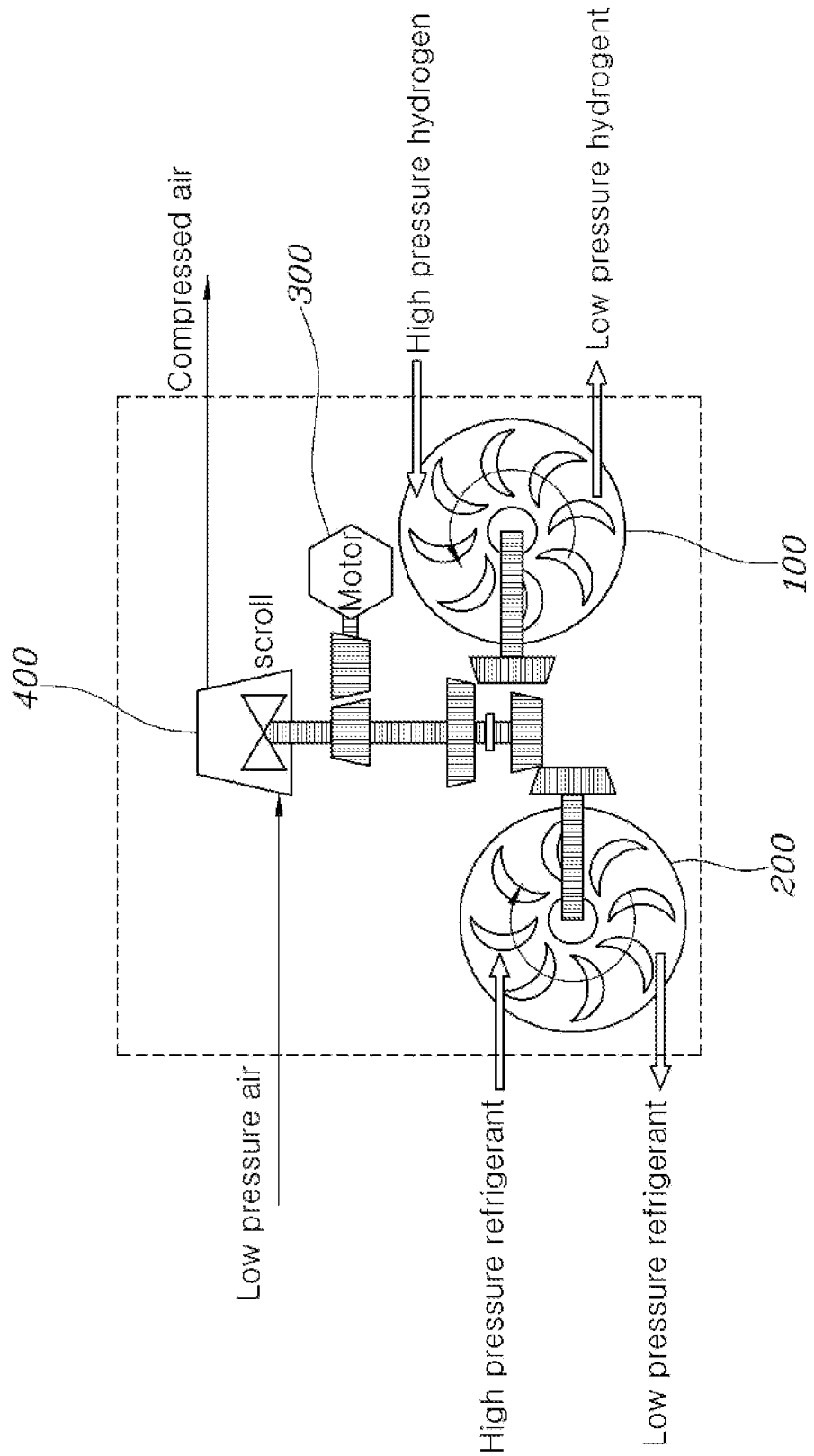
FIG. 2 is a schematic view exemplarily illustrating a blower of the integrated thermal management system for fuel cell mobility vehicles according to various exemplary embodiments of the present invention.

FIG. 1 is a circuit diagram of an integrated thermal management system for fuel cell mobility vehicles according to various exemplary embodiments of the present invention, and FIG. 2 is a schematic view exemplarily illustrating a blower of the integrated thermal management system for fuel cell mobility vehicles according to various exemplary embodiments of the present invention.

To achieve the above-described objects, an integrated thermal management system for fuel cell mobility vehicles according to various exemplary embodiments of the present invention includes a hydrogen tank B configured to store high-pressure hydrogen supplied to a fuel cell stack A, a first turbine 100 rotated by the pressure of the hydrogen discharged from the hydrogen tank B, a refrigerant circulation line 500 configured such that a refrigerant circulates therealong and a compressor 510, a condenser 520, an expansion valve 530 and an evaporator 540 are provided thereon, a second turbine 200 rotated by the high-pressure refrigerant discharged by the compressor 510, and a blower 400 configured to pressurize ambient air using the rotation force of the first turbine 100, the second turbine 200 or an electric motor 300 and to supply the pressurized ambient air to an indoor air conditioning unit or the fuel cell stack A.

Concretely, pressurization is required inside the mobility vehicle to continuously provide fresh air thereinto, and for the present purpose, the blower 400 configured to pressurize ambient air is required. In various exemplary embodiments of the present invention, ambient air is pressurized using high-pressure hydrogen gas used in the fuel cell stack A and the high-pressure refrigerant discharged by the compressor 510 in the mobility vehicle, and is additionally pressurized by the electric motor 300, and the pressurized ambient air is used to condition air of the interior of the mobility vehicle or is supplied to a fuel cell.

Referring to FIG. 1 and FIG. 2, the blower 400 shown in FIG. 2 has a structure in which the rotation shaft of the blower 400 is connected to the rotation shaft of the first turbine 100, the second turbine 200 or the electric motor 300 and is rotated to pressurize the ambient air.

The first turbine 100 may be rotated by the high-pressure hydrogen gas supplied to the fuel cell stack A, and the second turbine 200 may be rotated by the high-temperature and high-pressure refrigerant discharged by the compressor 510. The electric motor 300 may be subsidiarily used to operate the blower 400.

The ambient air pressurized by the blower 400 may flow through an ambient air supply line 410, the ambient air supply line 410 may branch off into a fuel cell line 411 and an air-conditioning line 412, and the pressurized ambient air may be supplied to the fuel cell stack A through the fuel cell line 411 and be supplied to the indoor air conditioning unit through the air-conditioning line 412.

Accordingly, because a separate blower configured to supply pressurized ambient air to the fuel cell stack A is not additionally provided and the blower 400 configured to pressurize ambient air for conditioning indoor air is configured for supplying the ambient air to the fuel cell stack A, the integrated thermal management system may have a compact structure and increase the traveling range of the mobility vehicle.

A humidifier configured to humidify ambient air when the ambient air is dry may be further provided on the fuel cell line 411, and because the ambient air may be sufficiently pressurized by the blower 400, the ambient air may flow into the fuel cell stack A and react with hydrogen to produce electricity.

Furthermore, the pressurized ambient air may be supplied to the indoor air conditioning unit through the air-conditioning line 412 to heat or cool the interior of the fuel cell mobility vehicle.

Concretely, the pressurized ambient air may be cooled through heat exchange with the refrigerant to cool the interior of the fuel cell mobility vehicle, and when it is necessary to heat the interior of the fuel cell mobility vehicle, may be heated through heat exchange with the refrigerant to heat the interior of the fuel cell mobility vehicle.

The respective flow rates of the pressurized ambient air discharged from the blower 400, which are to be supplied to the indoor air conditioning unit and the fuel cell stack A, may be controlled by a regulator 420.

That is, the regulator 420 may appropriately control the flow rate of the ambient air that the fuel cell stack A requires, and may cause the remainder of the ambient air to be supplied to the indoor air conditioning unit.

The first turbine 100 may be rotated by the high-pressure hydrogen gas supplied to the fuel cell stack A, the blower 400 may be rotated thereby to pressurize ambient air and to supply the pressurized ambient air to the indoor air conditioning unit and the fuel cell stack A, and when the amount of pressure applied to the ambient air is insufficient such as lower than a predetermined amount of pressure, the electric motor 300 may be additionally operated to increase the pressure applied to the ambient air.

Furthermore, when the interior of a fuel cell mobility vehicle is cooled, the blower 400 may be rotated by the second turbine 200 to pressurize the ambient air and to discharge the pressurized ambient air to the interior of the fuel cell mobility vehicle.

Concretely, the refrigerant is converted into a low-temperature state by the compressor 510, the condenser 520 and the expansion valve 530, and exchanges heat with ambient air pressurized by the evaporator 540 to cool the ambient air, being configured for cooling the interior of the fuel cell mobility vehicle.

In an exemplary embodiment of the present invention, ram air flows into the condenser 520. Here the ram air is ambient air, in which the dynamic air pressure thereof is created by vehicle motion, to allow a greater massflow of the ambient air through the condenser 520, hence increasing engine power.

Here, the evaporator 540 may be provided inside the indoor air conditioning unit, and the blower 400 may supply the pressurized ambient air to the indoor air conditioning unit to cool the interior of the fuel cell mobility vehicle.

In an exemplary embodiment of the present invention, an accumulator (Accum) is mounted between the compressor 510 and the evaporator 540.

A heater core 610 may be provided inside the indoor air conditioning unit, and the heater core 610 may be connected to a cooling fluid outlet of the fuel cell stack A.

Concretely, the heater core 610 is a component configured to heat the interior of the fuel cell mobility vehicle, and when the interior of the fuel cell mobility vehicle is heated, the cooling fluid may be heated by receiving waste heat generated due to power generation by the fuel cell and the heater core 610 may heat the interior of the fuel cell mobility vehicle through heat exchange between the pressurized ambient air and the heated cooling fluid.

The integrated thermal management system according to various exemplary embodiments of the present invention may further include a cooling fluid circulation line 600, configured such that the cooling fluid circulates to the fuel cell stack A through a water pump 620, the cooling fluid of the cooling fluid circulation line 600 passes through the heater core 610 and a radiator 640 via a control valve 630 after passing through the fuel cell stack A, the stream of the cooling fluid that has passed through the heater core 610 may join with the stream that has passed through the radiator 640, opening of the control valve 630 may be controlled depending on the operating state of the fuel cell stack A and on whether it is necessary to heat the interior of the fuel cell vehicle, and an electric heater 650 may be provided inside the indoor air conditioning unit to be operated when the temperature of the heater core 610 is not sufficiently high, such as lower than a predetermined temperature.

Concretely, when it is necessary to heat the interior of the fuel cell mobility vehicle, heating of the interior of the fuel cell mobility vehicle is performed using waste heat from the fuel cell stack A, and when the temperature of the heater core 610 is not sufficiently high, such as lower than a predetermined temperature, the electric heater 650 provided inside the indoor air conditioning unit may be operated to additionally heat the ambient air.

The cooling fluid heated via the fuel cell stack A flows along the cooling fluid circulation line 600, and when it is necessary to heat the interior of the fuel cell mobility vehicle, the cooling fluid may be discharged to the heater core 610 through the control valve 630 connected to the heater core 610 via a branch line 635, or when it is not necessary to heat the interior of the fuel cell mobility vehicle, the cooling fluid may be supplied to the radiator 640 through the control valve 630 to be dissipated.

Opening of the control valve 630 may be controlled depending on whether or not it is necessary to heat the interior of the fuel cell mobility vehicle, and may also be controlled depending on the operation of the fuel cell stack A.

As is apparent from the above description, an integrated thermal management system for fuel cell mobility vehicles according to various exemplary embodiments of the present invention may reduce the number and volume of blowers necessary to pressurize ambient air supplied to a passenger compartment inside a fuel cell vehicle and the amount of power consumed, accordingly, being configured for increasing the traveling range of the fuel cell mobility vehicle.

In an exemplary embodiment of the present invention, a coolant reservoir 615 is mounted in the cooling fluid circulation line 600, for storing the circulating coolant.

In an exemplary embodiment of the present invention, the coolant reservoir 615 is mounted in the cooling fluid circulation line 600, downstream of the heater core 610 and the radiator 640.

In an exemplary embodiment of the present invention, a controller is connected to at least one of the elements of the integrated thermal management system, such as the control valve 630, the water pump 620, the electric motor 300, and the regulator 420, to control the operations thereof.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated thermal management system for a fuel cell mobility vehicle, the integrated thermal management system comprising:
    a hydrogen tank configured to store hydrogen supplied to a fuel cell stack;
    a first turbine fluidically connected to the hydrogen tank and rotated by a pressure of the hydrogen discharged from the hydrogen tank;
    a refrigerant circulation line connecting a compressor, a condenser, an expansion valve and an evaporator, wherein a refrigerant circulates along the refrigerant circulation line;
    a second turbine mounted in the refrigerant circulation line and rotated by the refrigerant discharged by the compressor; and
    a blower connected to at least one of the first turbine, the second turbine and an electric motor and configured to pressurize ambient air using rotation force of the at least one of the first turbine, the second turbine and the electric motor and to supply the pressurized ambient air to an indoor air conditioning unit or the fuel cell stack.

2. The integrated thermal management system according to claim 1, wherein, when the fuel cell stack generates power, the blower is rotated by the first turbine to pressurize the ambient air and to supply the pressurized ambient air to the indoor air conditioning unit and the fuel cell stack, and when a pressure applied to the ambient air is lower than a predetermined amount of pressure, the electric motor is additionally operated to increase the pressure applied to the ambient air.

3. The integrated thermal management system according to claim 1, wherein, when an interior of the fuel cell mobility vehicle is cooled, the blower is rotated by the second turbine to pressurize the ambient air and to discharge the pressurized ambient air to the interior of the fuel cell mobility vehicle.

4. The integrated thermal management system according to claim 1, further including an ambient air supply line connected to the blower,
    wherein the pressurized ambient air flows through the ambient air supply line, and
    wherein the ambient air supply line branches off into a fuel cell line connected to the fuel cell stack and an air-conditioning line, and the pressurized ambient air is supplied to the fuel cell stack through the fuel cell line and supplied to the indoor air conditioning unit through the air-conditioning line.

5. The integrated thermal management system according to claim 4, further including:
    a regulator connected to the ambient air supply line, the fuel cell line and the air-conditioning line,
    wherein respective flow rates of the pressurized ambient air discharged from the blower and supplied to the indoor air conditioning unit and the fuel cell stack are controlled by the regulator.

6. The integrated thermal management system according to claim 1, wherein the evaporator is provided inside the indoor air conditioning unit, and the blower is configured to supply the pressurized ambient air to the indoor air conditioning unit.

7. The integrated thermal management system according to claim 6, wherein a heater core is provided inside the indoor air conditioning unit, and the heater core is connected to a cooling fluid outlet of the fuel cell stack.

8. The integrated thermal management system according to claim 7, wherein an electric heater is provided inside the indoor air conditioning unit, and the electric heater is operated when a temperature of the heater core is lower than a predetermined temperature.

9. The integrated thermal management system according to claim 7, wherein the air-conditioning line is connected to the evaporator, the heater core, and an electric heater.

10. The integrated thermal management system according to claim 9, wherein the electric heater is operated when a temperature of the heater core is lower than a predetermined temperature.

11. The integrated thermal management system according to claim 7, further including:
    a cooling fluid circulation line connected to the fuel cell stack and a pump, wherein a cooling fluid circulates to the fuel cell stack through the cooling fluid circulation line by operation of the pump;
    a radiator and a control valve connected to the cooling fluid circulation line; and
    a branch line connecting the control valve, the heater core and the pump by bypassing the radiator.

12. The integrated thermal management system according to claim 11, wherein the cooling fluid of the cooling fluid circulation line passes through the branch line connecting the heater core and the radiator via the control valve after passing through the fuel cell stack, and wherein a stream of the cooling fluid having passed through the heater core by bypassing the radiator joins with a stream of the cooling fluid having passed through the radiator.

13. The integrated thermal management system according to claim 11, wherein opening of the control valve is controlled according to an operating state of the fuel cell stack and according to whether heating of the interior of the fuel cell mobility vehicle is required.

14. The integrated thermal management system according to claim 11, wherein the condenser and the radiator are aligned adjacent to each other.

15. The integrated thermal management system according to claim 11, wherein a coolant reservoir is mounted in the cooling fluid circulation line, downstream of the heater core and the radiator.

* * * * *